A. MARKUSSEN.
PRIMER.
APPLICATION FILED JUNE 26, 1918.
1,288,635.
Patented Dec. 24, 1918.
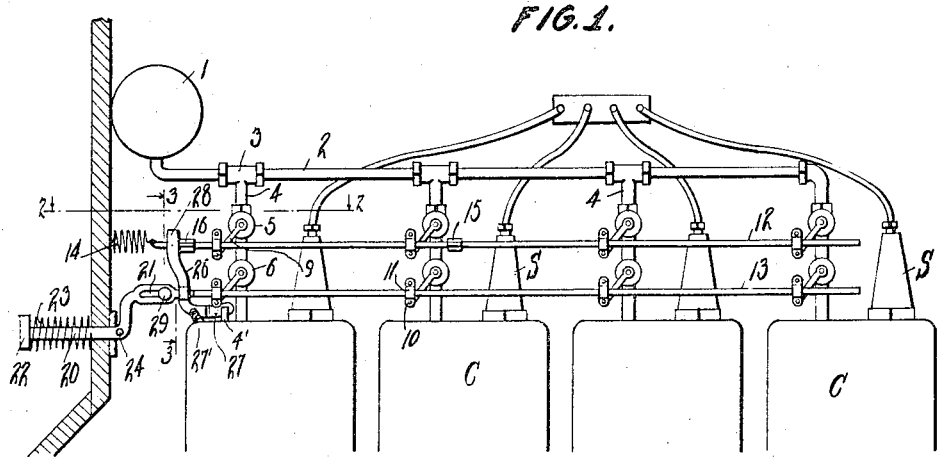
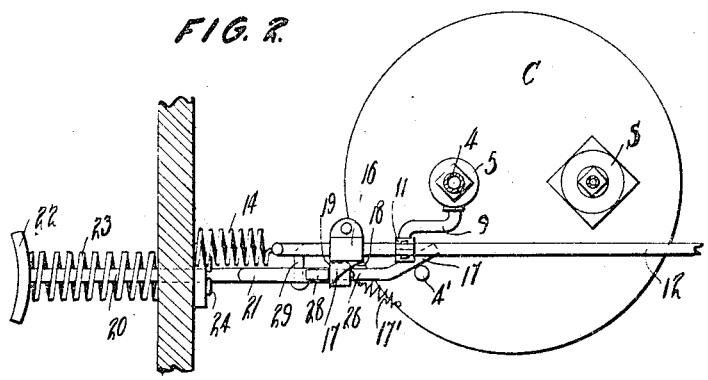
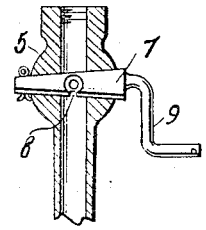
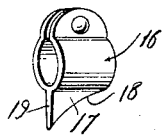
Witnesses
W. C. Fielding
N. L. Clamer
Inventor
Alvah Markussen
By Richard Bowen
Attorney

UNITED STATES PATENT OFFICE.

ALVAH MARKUSSEN, OF HOOPER, NEBRASKA.

PRIMER.

1,288,635. Specification of Letters Patent. Patented Dec. 24, 1918.

Application filed June 26, 1918. Serial No. 241,981.

*To all whom it may concern:*

Be it known that I, ALVAH MARKUSSEN, a citizen of the United States, residing at Hooper, in the county of Dodge and State of Nebraska, have invented certain new and useful Improvements in Primers, of which the following is a specification.

This invention relates to internal combustion engines, and more especially to starting devices; and the object of the same is to produce an improved primer operable by the operator's foot whereby all cylinders will be charged with an equal charge of gasolene without further attention on his part than pressure.

A further object is to produce a machine in which, when it is primed, the parts will automatically resume their set position ready for the next action.

A further object is to produce a machine of this kind applicable to cars of a variety of makes.

Yet other objects will appear in the following specification and claims, and reference is made to the drawings wherein:

Figure 1 is a side elevation of this device applied to a four-cylinder engine,

Fig. 2 a horizontal sectional detail on the line 2—2 of Fig. 1.

Fig. 3 a vertical section on the line 3—3 of Fig. 1,

Fig. 4 is a perspective view of the push bar,

Fig. 5 is a perspective detail of one of the clips,

Fig. 6 is an enlarged sectional detail of one of the upper primer valves, or pet cocks.

For purposes of illustration, I have shown four cylinders C, the ignition system is indicated by S applied to the spark plugs, and D is the dash. From a reservoir 1 leads a pipe 2 passing through couplings 3 from which branches 4 lead downward through upper pet cocks 5 and lower pet cocks 6 into the respective cylinders. The pet cocks 5 and 6 are slightly spaced so that within each upright branch between these two cocks or valves a small charge of gasolene may accumulate. When the lower valve stands closed and the upper valve is opened, such charge runs into the space, then when the upper valve is closed, the supply is cut off, then when the lower valve is opened the charge runs into the cylinder, and subsequently the lower valve is closed so that a second charge may be admitted. In order to allow the charge to run out through the open lower valve when the upper valve is closed, I provide the valve plug 7 (see Fig. 6) with a vent 8 which, in connection with the port through this plug, will allow air to enter through the valve casing above the charge and permit the charge to run down through the cylinder; and yet no more gasolene from the supply pipe 2 can pass through this valve until it is opened. The mechanism for actuating these several valves constitutes the gist of the present invention, and as it is the same for all cylinders and would be the same whether there are four cylinders or more or less, I need describe but one. Each valve has a crank 9 on its plug which is pivotally mounted in an eye 10 at the lower end of a clip 11, the clips of the upper valves being fast on an upper rod 12 and those of the lower valves on a lower rod 13. The upper rod is drawn inward or toward the dash D by a spring 14 and is limited in its movement by a stop 15 which strikes one of the branch pipes 4. Secured to this rod is a special clip 16 shown in Fig. 5, the same having on one side a tooth 17 beveled off as at 18 on its outer face and having an abrupt inner face 19 for a purpose to appear. The lower set of clips 11 are attached to the lower rod 13, and all valves are closed when their cranks 9 stand obliquely inward as seen in Fig. 1.

A push bar 20 is slidably mounted through the dash D and has its forward end upturned and slotted as at 21, while its rearward or inner end is provided with a foot piece 22, and a spring 23 encircles its body between said foot piece and dash, a pin 24 limiting the action of the spring. The front end of the push bar is pivoted at 25 to the mid-length of a rock lever 26 standing substantially upright, and the lower end of this lever has a cam 27 adapted to contact with a pin 4' near the innermost branch pipe 4 while its upper end has a finger 28 standing alongside the upper rod 12 behind the clip 16. The inner end of the lower rod 13 is bent at right angles into a stud 29 which enters the slot 21.

The parts stand normally as seen in Fig. 1. When now the operator desires to prime the cylinders, he has but to put his foot on the foot piece 22 and push forward. The bar 20 slides through the dash and its pivotal connection 25 with the rock lever causes the latter to move bodily forward. The advance of its finger 28 moves the upper rod 12 forward and opens all the upper valves, permitting a small charge in each branch pipe 4 to run down onto the lower valve. Next as the rear end of the slot 21 strikes the stud 29 and the lower rod 13 begins to move forward, the cam 27 on the rock lever strikes the pin 4' and swings said lever so that its finger disengages the abrupt face 19 of the tooth 17 on the upper rod 12, and the spring 14 retracts the slide and closes the upper valves. Continued forward movement of the push bar now opens all the lower valves, so that the charges in the branch pipes run down into the cylinders C as the vents 8 in the upper valves permit. When the operator removes his foot, the spring 23 retracts the lower rod 13 and the beveled face 18 of the tooth 17 causes the rock lever to ride over the tip of this tooth while a spring 27' of the rock lever causes it to be restored to its normal position ready for the next action. It is quite obvious that the rods may be of any length and the clips 11 disposed thereon directly above cylinders which are differently spaced than as shown in Fig. 1. Also it is obvious that the branch pipes 4 may be tapped into the top of cylinders of a variety of types, and therefore it will be clear that this attachment may be applied to automobiles of a variety of makes and having from one cylinder upward.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a primer, the combination with a source of gasolene supply, a pipe leading thence into the head of a cylinder, upper and lower valves in said pipe, and a crank on each valve; of a spring-retracted rod connected with the crank of the upper valve, a rod connected with the crank of the lower valve, pedal mechanism for advancing the last-named rod, and connections between the upper rod and pedal mechanism whereby action of the latter advances the upper rod first, then the lower rod, and then releases the upper rod, for the purpose set forth.

2. In a primer, the combination with a source of gasolene supply, a pipe leading thence into the head of a cylinder, upper and lower valves in said pipe, and a crank on each valve; of a spring-retracted rod connected with the crank of the upper valve, a rod connected with the crank of the lower valve, pedal mechanism for advancing the last-named rod, a rocking lever on said pedal mechanism, connections between such mechanism and the lower rod permitting a lost motion between these elements, a tooth on the upper rod engaged by said lever when the advance of the pedal mechanism commences, and means for swinging said lever to disengage the tooth after the movement of the lower rod has been completed.

3. In a primer, the combination with a source of gasolene supply, a pipe leading from said source into the head of a cylinder, upper and lower valves in said pipe, and longitudinally movable rods controlling said valves, of a spring retracting the upper rod to hold its valve closed, a stud at the end of the lower rod, spring-retracted pedal mechanism having a slot loosely engaging said stud whereby the action of this spring holds the lower valve normally closed, a rock lever pivoted to said mechanism, a tooth on the upper rod engaged by said lever when the forward movement of the mechanism commences, and means for disengaging the lever from the tooth when the forward movement of the lower rod has ceased.

4. In a primer, the combination with a source of gasolene supply, a pipe leading therefrom into the top of each cylinder, and spaced valves in said pipe, each having a crank on its plug; of rods pivoted to the cranks of the upper and lower valves, a spring retracting the upper rod to hold its valve normally closed, pedal mechanism for advancing the lower rod, a stud-and-slot connection between said mechanism and rod for permitting lost motion between these elements, connections between said mechanism and upper rod for starting the advance of the latter when said mechanism starts, and means for tripping said connections when the advance of the lower rod commences.

5. In a primer, the combination with a source of gasolene supply, a pipe leading therefrom into the top of each cylinder, and spaced valves in said pipe, each having a crank on its plug; of rods pivoted to the cranks of the upper and lower valves, a spring retracting the upper rod to hold its valves normally closed, pedal mechanism for advancing the lower rod, a stud-and-slot connection between said mechanism and rod for permitting lost motion between these elements, a rock lever pivoted to said mechanism and having at its upper end a finger and at its lower end a cam, the latter engaging and actuated by a fixed object on the advance of the mechanism, and a clip on the upper rod having a tooth engaged by said finger but disengaged therefrom under said cam action.

In testimony whereof I affix my signature in presence of two witnesses.

Mr. ALVAH MARKUSSEN.

Witnesses:
R. L. Schwab,
Stephen F. Browne.

Copies of this patent may be obtained for five cents each, by addressing the "Commissioner of Patents, Washington, D. C."